(12) United States Patent
Lee et al.

(10) Patent No.: US 12,565,131 B2
(45) Date of Patent: Mar. 3, 2026

(54) VEHICLE DOOR ARMREST

(71) Applicants: Hyundai Motor Company, Seoul (KR); Kia Corporation, Seoul (KR); SEOYON E-HWA CO., LTD, Anyang-si (KR)

(72) Inventors: Jaeseung Lee, Whasung-Si (KR); Dowon Kim, Whasung-Si (KR); Jun Tae Park, Whasung-Si (KR)

(73) Assignees: Hyundai Motor Company, Seoul (KR); Kia Corporation, Seoul (KR); SEOYON E-HWA CO., LTD, Anyang-si (KR)

( * ) Notice: Subject to any disclaimer, the term of this patent is extended or adjusted under 35 U.S.C. 154(b) by 186 days.

(21) Appl. No.: 18/242,371

(22) Filed: Sep. 5, 2023

(65) Prior Publication Data

US 2024/0253545 A1 Aug. 1, 2024

(30) Foreign Application Priority Data

Feb. 1, 2023 (KR) ........................ 10-2023-0013488

(51) Int. Cl.
| | |
|---|---|
| *B60N 2/75* | (2018.01) |
| *B60J 5/04* | (2006.01) |
| *B60J 5/06* | (2006.01) |
| *B60R 11/00* | (2006.01) |
| *B60R 13/02* | (2006.01) |
| *E05B 85/00* | (2014.01) |
| *E05B 85/12* | (2014.01) |

(52) U.S. Cl.
CPC .............. *B60N 2/767* (2018.02); *B60N 2/78* (2018.02); *B60J 5/0493* (2013.01); *B60J 5/06* (2013.01); *B60N 2/75* (2018.02); *B60N 2/783*

(2018.02); *B60R 11/00* (2013.01); *B60R 2011/0036* (2013.01); *B60R 2011/0085* (2013.01); *B60R 2011/0092* (2013.01); *B60R 13/02* (2013.01); *E05B 85/00* (2013.01); *E05B 85/12* (2013.01)

(58) Field of Classification Search
CPC .......... B60N 2/767; B60N 2/78; B60N 2/783; B60N 2/75; E05B 85/12; E05B 85/00; B60J 5/0493; B60J 5/06; B60R 11/00; B60R 13/02; B60R 2011/0036; B60R 2011/0085; B60R 2011/0092
See application file for complete search history.

(56) References Cited

U.S. PATENT DOCUMENTS

| | | | | |
|---|---|---|---|---|
| 5,833,416 A * | 11/1998 | Cau | ......................... | F16B 21/02 |
| | | | | 296/146.7 |
| 2017/0267189 A1* | 9/2017 | Hirose | .................... | B60R 13/02 |
| 2018/0304789 A1* | 10/2018 | Robert | ................... | B60N 2/777 |

* cited by examiner

*Primary Examiner* — Jay Khandpur
(74) *Attorney, Agent, or Firm* — Morgan Lewis & Bockius LLP

(57) ABSTRACT

A vehicle door armrest apparatus is a door armrest provided on a luggage trim connected to a rear side of a door trim of a door of a vehicle, the vehicle door armrest apparatus including a housing portion on which an arm of a passenger is placed and which is provided on an internal side of the luggage trim and configured to rotate along an internal surface of the door trim, and a housing magnet operating to fix or release the housing portion to or from the door trim by generating or releasing a magnetic force depending on whether power is applied to the housing magnet with the door trim located between the housing magnet and a door magnet.

20 Claims, 21 Drawing Sheets

VEHICLE DOOR ARMREST

CROSS-REFERENCE TO RELATED APPLICATION

The present application claims priority to Korean Patent Application No. 10-2023-0013488 filed on Feb. 1, 2023, the entire contents of which is incorporated herein for all purposes by this reference.

BACKGROUND OF THE PRESENT DISCLOSURE

Field of the Present Disclosure

The present disclosure relates to a vehicle door armrest, and more particularly, to a vehicle door armrest capable of supporting an arm of a passenger inside a vehicle including a sliding door structure.

Description of Related Art

In general, a vehicle has a compartment including a predetermined size and into which a driver or an accompanying passenger may get, and compartment doors are provided on a vehicle body to open or close the compartment.

In a case of a passenger vehicle, the compartment doors include a front door provided on the front side of the vehicle in a longitudinal direction and a rear door provided on the rear side of the vehicle in the longitudinal direction, and the front door and the rear door are usually rotatably provided on the vehicle body by hinges.

In a case of a van in which many people may ride, the compartment door opens or closes the compartment while sliding back and forth in the longitudinal direction of the vehicle.

The sliding compartment door of the van moves backward in the longitudinal direction of the vehicle to open the compartment, and moves forward in the longitudinal direction of the vehicle to close the compartment. Therefore, the sliding compartment door needs a smaller space for opening and closing the compartment as compared with the hinged compartment door of the passenger vehicle, and a door opening portion formed in the vehicle body may thus be completely opened even with a narrow space for opening and closing the compartment.

Meanwhile, a door armrest that supports an arm of a passenger is provided at a door of a vehicle. However, in a vehicle in which sliding compartment doors 2 and 3 are provided on a vehicle body 1 as illustrated in FIG. 1, it is difficult to secure a space for a door armrest on a rear door 3 side because a swing gap G needs to be secured.

FIG. 2 is an enlarged view of portion "A" of FIG. 1, which is a vehicle hinge coupling portion. FIG. 3 is a cross-sectional view taken along line B-B' of FIG. 2. As illustrated in FIG. 2 and FIG. 3, in a case of the hinged compartment door, it is inevitable to reduce the length of the existing armrest to avoid interference in a space between the rear door 3 and a luggage trim 5 when opening the door, and thus, the space for the armrest is reduced by "L". In the instant case, it is difficult to secure the space for the armrest for supporting an arm of a passenger, which results in deterioration in usability.

The information included in this Background of the present disclosure is only for enhancement of understanding of the general background of the present disclosure and may not be taken as an acknowledgement or any form of suggestion that this information forms the prior art already known to a person skilled in the art.

Brief Summary

Various aspects of the present disclosure are directed to providing a vehicle active door armrest structure configured as an armrest by rotating in response to opening and closing of a hinged compartment door.

According to an exemplary embodiment of the present disclosure, a door armrest provided on a luggage trim connected to a rear side of a door trim of a door of a vehicle includes a housing portion on which an arm of a passenger is placed and which is provided on an internal side of the luggage trim and configured to rotate along an internal surface of the door trim, and a housing magnet operating to fix or release the housing portion to or from the door trim by generating or releasing a magnetic force depending on whether or not power is applied with the door trim located between the housing magnet and a door magnet.

The vehicle door armrest apparatus may further include a return bracket portion housed in the housing portion, including a first portion fixed to the housing magnet, and rotating when the magnetic force is released to release the housing portion from the door trim, a button portion provided in the housing portion and coming into contact with a second portion of the return bracket portion to rotate the return bracket portion, and a rotation portion including one end portion rotatably coupled to the luggage trim, provided to cross the housing portion, and rotating so that the housing portion is positioned in a vertical direction of a vehicle body when the housing magnet is released from the door trim.

The housing portion may include an upper housing on which the arm of the passenger is directly placed, and a lower housing coupled to the upper housing and housing the housing magnet, the return bracket portion, the button portion, and the rotation portion therein.

The housing magnet may face the door magnet fixed on the door trim and be connected or disconnected to or from the door magnet by the magnetic force applied to or released from the door magnet.

The housing magnet may be provided on an external cover guide that covers the housing magnet and is in contact with the return bracket portion to move forwards and backwards with respect to the door trim according to an operation of the return bracket portion.

A guide cap that moves forwards and backwards with respect to the door trim according to the operation of the return bracket portion, an internal cover guide that covers the guide cap, and a magnet cap that houses the housing magnet and passes through an opening of the housing portion may be provided on the external cover guide.

An internal spring may be located between the housing magnet and the guide cap, and an external spring may be located between the lower housing and the internal cover guide.

The door magnet may be provided on a fixing bracket fixed on the door trim.

The return bracket portion may rotate in a horizontal direction of the housing portion around a rotation shaft inside the housing portion, and the return bracket portion includes a return bracket including a first portion which is in contact with the external cover guide and a second portion which is in contact with the button portion, and a return spring that provides an elastic force to release an attractive force between the housing magnet and the door magnet when the magnetic force applied to the door magnet is released.

The button portion may include a push button which is provided to penetrate through one side portion of the housing portion, a button cover which is provided inside the housing portion and guides the push button, and a cap button which is provided on a side opposite to the push button and comes into contact with or is separated from the other portion of the return bracket.

A button spring that provides an elastic rebound force between the push button and the cap button may be provided on an external circumferential surface of the push button.

A button socket which is in contact with the button spring while supporting the push button may be located between the external circumferential surface of the push button and the button spring.

The rotation portion may include a rotation pin penetrating through a side portion of the housing portion, and a rotation spring provided on an external circumferential surface of the rotation pin to provide a rotation force to the rotation pin.

When a door opening signal is generated, the magnetic force applied to the door magnet may be released, the return bracket portion may rotate to release an attractive force between the door magnet and the housing magnet, and the rotation portion may rotate so that the housing portion rotates to be positioned in the vertical direction of the vehicle body.

When the passenger pushes the button portion, the button portion may push the other portion of the return bracket portion, and the return bracket portion may rotate to release an attractive force between the housing magnet provided at the one portion of the return bracket portion, and the door magnet.

According to another exemplary embodiment of the present disclosure, a vehicle door armrest apparatus provided on a luggage trim connected to a rear side of a door trim of a door of a vehicle includes a housing portion on which an arm of a passenger is placed and which is provided on an internal side of the luggage trim and configured to rotate along an internal surface of the door trim, a motor housed in the housing portion and driven when a door opening signal is generated to rotate the housing portion, and a rotation shaft including one end portion rotatably coupled to the luggage trim, provided to cross the housing portion, and rotating so that the housing portion is positioned in a vertical direction of a vehicle body when the motor is driven.

The housing portion may include an upper housing on which the arm of the passenger is directly placed, and a lower housing coupled to the upper housing to form a space inside the housing portion.

A rotation gear may be provided at the other end portion of the rotation shaft, and the rotation gear may mesh with a motor gear provided on a shaft of the motor and rotate together with the motor gear.

The motor may be fixed inside the housing portion by a motor bracket in the housing portion.

Position sensors that detect a position of the housing portion and an electronic control unit which is configured to control rotation of the housing portion may be provided on an external side of the luggage trim.

According to an exemplary embodiment of the present disclosure, as the active door armrest structure that functions as an armrest when the hinged compartment door is closed, and rotates in such a way as not to interfere with opening of the compartment door when the compartment door is opened is provided, it is possible to secure a door armrest space for supporting an arm of a passenger.

Furthermore, cost reduction and a high degree of layout freedom may be achieved by not requiring a separate device in securing a space for a door armrest and eliminating interference occurring in a process of opening and closing a sliding door.

Furthermore, as the automatically rotatable armrest structure using the motor and the sensor is applied, usability may be greatly improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 12 is a view exemplarily illustrating states of a vehicle door armrest according to another exemplary embodiment of the present disclosure when the door is opened and closed:

Figure 1:
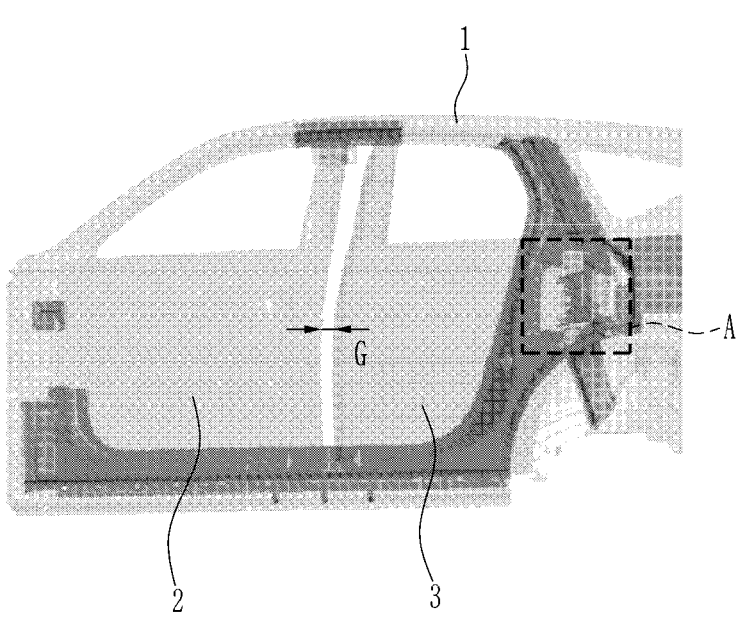
FIG. 1 is a side view exemplarily illustrating a vehicle including an existing sliding compartment door.
Figure 2:
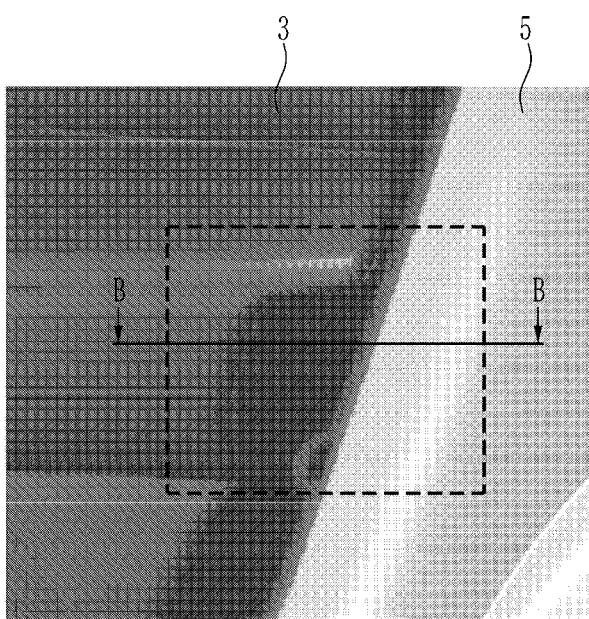
FIG. 2 is an enlarged view of portion "A" of FIG. 1, which is a vehicle hinge coupling portion.
Figure 3:
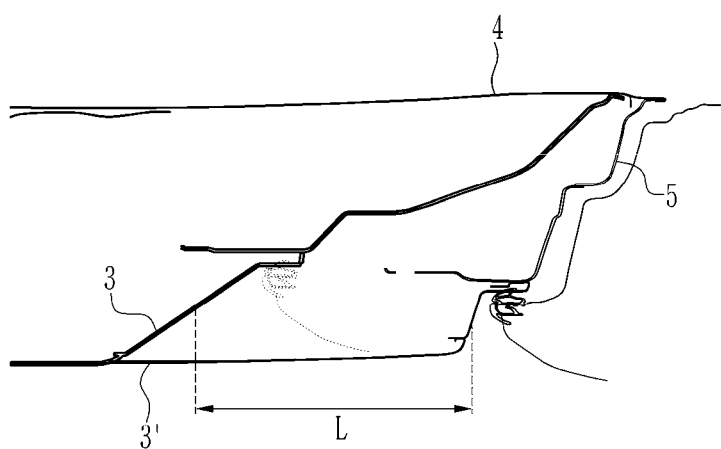
FIG. 3 is a cross-sectional view taken along line B-B' of FIG. 2.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings so that those skilled in the art to which the present disclosure pertains may easily practice the present disclosure. However, the present disclosure may be implemented in various different forms and is not limited to exemplary embodiments provided herein.

Furthermore, in several exemplary embodiments of the present disclosure, components including the same configuration will be representatively described using the same reference numerals in an exemplary embodiment of the present disclosure, and only components different from those of an exemplary embodiment will be described in the other exemplary embodiments of the present disclosure.

It is to be noted that the drawings are schematic and not drawn to scale. Relative dimensions and proportions of portions in the drawings are shown exaggerated or reduced in size for clarity and convenience in the drawings, and any dimensions are illustrative only and not limiting. Furthermore, the same reference numerals are used to indicate similar features in the same structure, element or part appearing in two or more drawings. When a part is referred to as being "on" another part, it may be directly on the another part or may have other parts intervening therebetween.

An exemplary embodiment of the present disclosure will be described in detail. As a result, various modifications of the exemplary embodiment are expected. Therefore, an exemplary embodiment of the present disclosure is not limited to a specific aspect of an illustrated region, and for example, includes modifications made for manufacturing.

Hereinafter, a vehicle door armrest according to an exemplary embodiment of the present disclosure will be described in detail with reference to the accompanying drawings.

Figure 4:
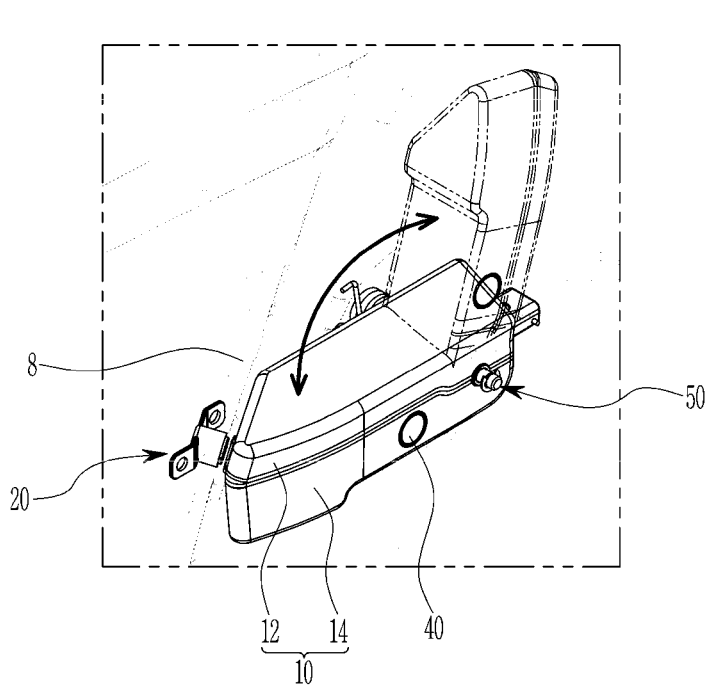
FIG. 4 is a perspective view exemplarily illustrating a vehicle door armrest according to an exemplary embodiment of the present disclosure.
Figure 5:
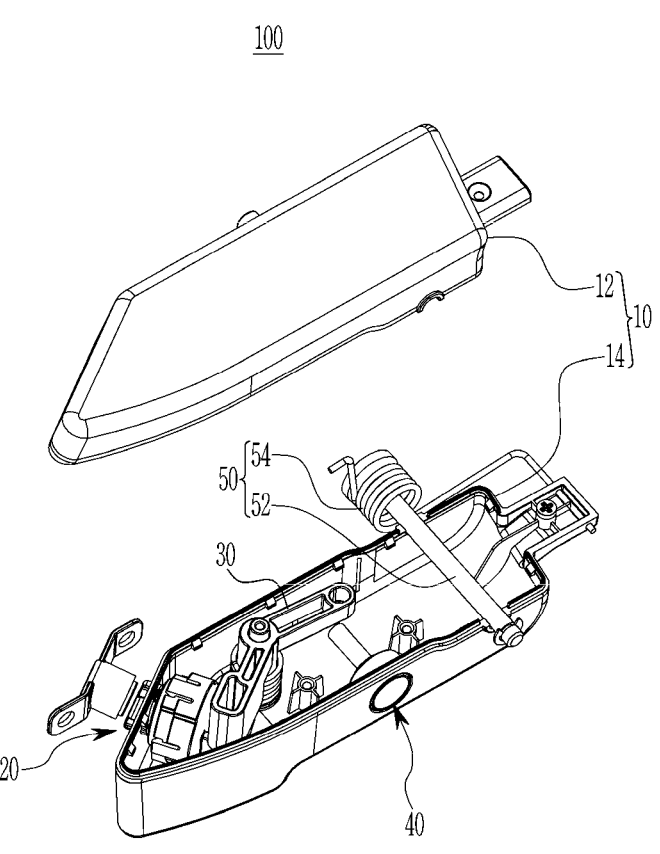
FIG. 5 is a perspective view exemplarily illustrating the inside of a housing portion of the vehicle door armrest according to an exemplary embodiment of the present disclosure.
Figure 6A:
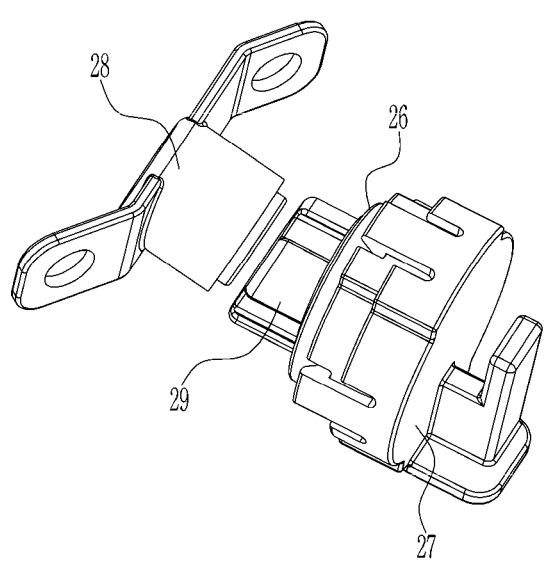
FIG. 6A and FIG. 6B are views exemplarily illustrating a connection relationship between a housing magnet of the vehicle door armrest and a door magnet according to an exemplary embodiment of the present disclosure.
Figure 6B:
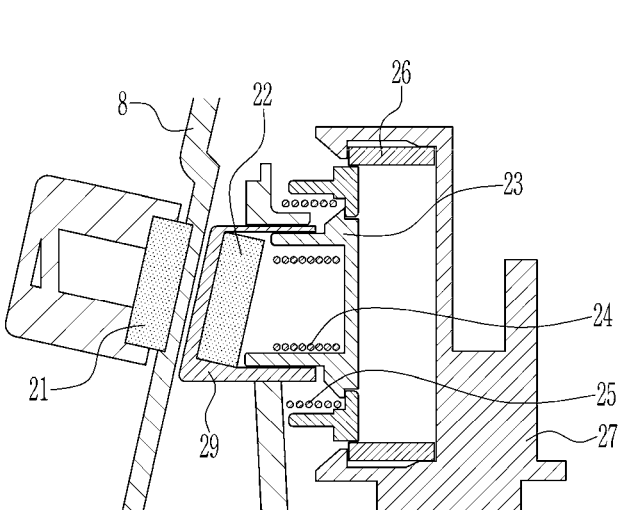
Figure 7:
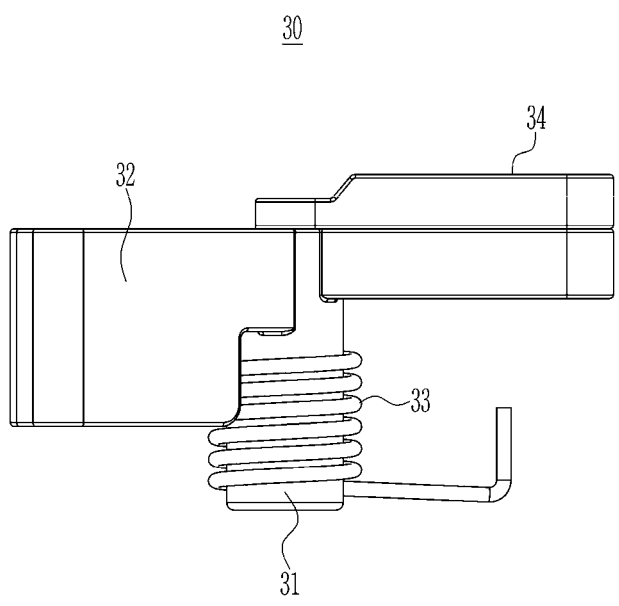
FIG. 7 is a view exemplarily illustrating a return bracket portion of the vehicle door armrest according to an exemplary embodiment of the present disclosure.
Figure 8A:
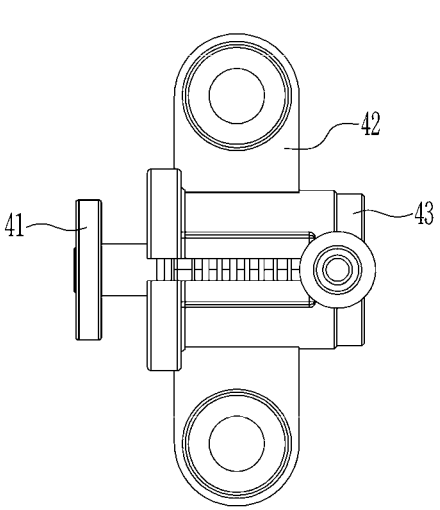
FIG. 8A and FIG. 8B are views exemplarily illustrating a button portion of the vehicle door armrest according to an exemplary embodiment of the present disclosure.
Figure 8B:
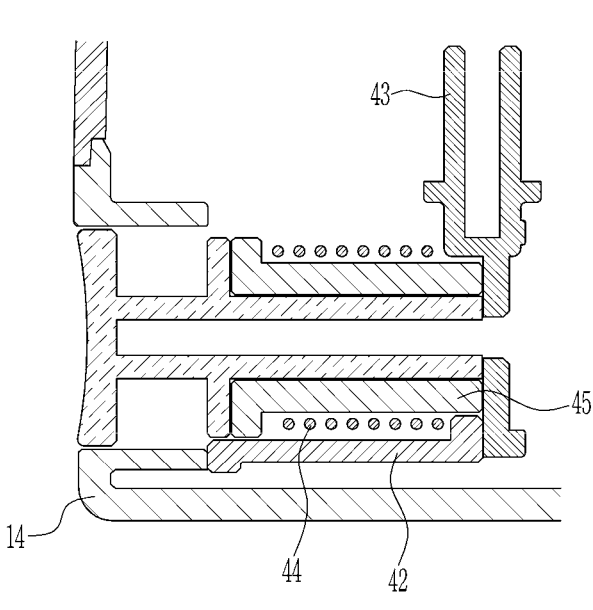

FIG. 4 is a perspective view exemplarily illustrating the vehicle door armrest according to an exemplary embodiment of the present disclosure. FIG. 5 is a perspective view exemplarily illustrating the inside of a housing portion of the vehicle door armrest according to an exemplary embodiment of the present disclosure. FIG. 6A and FIG. 6B are views exemplarily illustrating a connection relationship between a housing magnet of the vehicle door armrest and a door magnet according to an exemplary embodiment of the present disclosure. FIG. 7 is a view exemplarily illustrating a return bracket portion of the vehicle door armrest according to an exemplary embodiment of the present disclosure. FIG. 8A and FIG. 8B are views exemplarily illustrating a button portion of the vehicle door armrest according to an exemplary embodiment of the present disclosure.

First of all, referring to FIG. 4, a vehicle door armrest 100 according to an exemplary embodiment of the present disclosure may be applied to an internal side of a rear door provided on a rear side of a vehicle in a longitudinal direction, and may be applied to a structure in which the rear door is opened or closed by moving inward and outward with respect to the vehicle and sliding forwards and backwards in the longitudinal direction of the vehicle. However, the vehicle door armrest 100 according to an exemplary embodiment of the present disclosure is not only applied to the rear door, but may also be applied to a front door. The vehicle door armrest 100 according to an exemplary embodiment of the present disclosure may be provided on a luggage trim connected to a rear side of a door trim 8 of the door of the vehicle.

Referring to FIG. 4 and FIG. 5, the vehicle door armrest 100 according to an exemplary embodiment of the present disclosure includes a housing portion 10 and a housing magnet 22.

The housing portion 10 includes an upper surface on which an arm of a passenger may be placed, is provided on an internal side of the luggage trim, and rotates along an internal surface of the door trim 8. The housing portion 10 may include an upper housing 12 on which an arm of a passenger is directly placed, and a lower housing 14 coupled to a lower portion of the upper housing 12. The housing magnet 22, a return bracket portion 30, a button portion 40, and a rotation portion 50 may be housed in the lower housing 14.

The housing magnet 22 may operate to fix or release the housing portion 10 to or from the door trim 8 in a horizontal direction of a vehicle body by generating or releasing a magnetic force depending on whether power is applied with the door trim 8 located between the housing magnet 22 and a door magnet 21.

Referring to FIG. 6, the housing magnet 22 may be disposed to face the door magnet 21 fixed on the door trim 8, and the housing magnet 22 and the door magnet 21 may be connected to or disconnected from each other by a magnetic force applied to or released from the door magnet 21. At the instant time, the door magnet 21 may be formed of an electromagnet, and the housing magnet 22 may be formed of a permanent magnet. As the magnetic force is applied to or released from the door magnet 21, the door magnet 21 and the housing magnet 22 may be connected to or disconnected from each other by the magnetic force.

Furthermore, the housing magnet 22 may be provided on an external cover guide 27 that covers the housing magnet 22 and is in contact with the return bracket portion 30 to move forwards and backwards with respect to the door trim 8 according to an operation of the return bracket portion 30.

Furthermore, a guide cap 23 that moves forwards and backwards with respect to the door trim 8 according to the operation of the return bracket portion 30, an internal cover guide 26 that covers the guide cap 23, and a magnet cap 29 that houses the housing magnet 22 and passes through an opening of the housing portion 10 may be provided on the external cover guide 27. At the instant time, an internal spring 24 may be located between the housing magnet 22 and the guide cap 23, and an external spring 25 may be located between the lower housing 14 and the internal cover guide 26.

Furthermore, the door magnet 21 may be provided on a fixing bracket 28 fixed on the door trim 8. The fixing bracket 28 may be provided so that the door magnet 21 is exposed to the door trim 8, and the magnet cap 29 may cover the housing magnet 22, so that the door magnet 21 and the magnet cap 29 indirectly come into contact with each other with the door trim 8 interposed therebetween.

Meanwhile, the vehicle door armrest 100 according to an exemplary embodiment of the present disclosure may further include the return bracket portion 30, the button portion 40, and the rotation portion 50.

Referring to FIG. 7, the return bracket portion 30 may be housed in the housing portion 10 and may be engaged to the external cover guide 27. The return bracket portion 30 may rotate in response to movement of the housing magnet 22. That is, when the door magnet 21 moves toward the door trim 8 or moves away from the door trim 8 as the magnetic force is applied to or released from the door magnet 21, the return bracket portion 30 may also rotate together.

The return bracket portion 30 may rotate in a horizontal direction of the housing portion 10 around a rotation shaft 31 provided inside the housing portion 10. Furthermore, the return bracket portion 30 may include a return bracket 32 including one portion which is in contact with the external cover guide 27 adjacent to the housing magnet 22 and the other portion which is in contact with the button portion 40, and a return spring 33 that provides an elastic force to release an attractive force between the housing magnet 22 and the door magnet 21 when the magnetic force applied to the door magnet 21 is released.

The return spring 33 may be wound around an external circumferential surface of the rotation shaft 31 to provide an elastic rebound force so that the door magnet 21 is separated from the housing magnet 22 when the magnetic force at a sliding magnet portion 20 is released.

Referring to FIG. 8, the button portion 40 may be provided in the housing portion 10 and may rotate the return bracket portion 30 by coming into contact with a second portion of the return bracket portion 30. The button portion 40 may include a push button 41 which is provided to penetrate through one side portion of the housing portion 10, a button cover 42 which is provided inside the housing portion 10 and guides the push button 41, and a cap button 43 which is provided on a side opposite to the push button 41 and comes into contact with or is separated from the other portion of the return bracket portion 30.

Furthermore, a button spring 44 that provides an elastic rebound force between the push button 41 and the cap button 43 may be provided on an external circumferential surface of the push button 41.

Furthermore, a button socket 45 which is in contact with the button spring 44 while supporting the push button 41 may be located between the external circumferential surface of the push button 41 and the button spring 44.

When a passenger pushes the push button 41 of the button portion 40, the cap button 43 of the button portion 40 comes into contact with and pushes the other portion of the return bracket portion 30, and the return bracket portion 30 rotates. As the return bracket portion 30 rotates, the external cover guide 27 fixed to the one portion of the return bracket portion 30, and the magnet cap 29 are separated from the door trim 8. Accordingly, the fixation by the magnetic force of the door magnet 21 and the housing magnet 22 is released. That is, even in a case where the magnetic force is applied to the door magnet 21 and the housing magnet 22 and an attractive force is acting, when a passenger pushes the button portion 40, fixation of the housing portion 10 to the door trim 8 in the horizontal direction of the vehicle body may be forcibly released.

Meanwhile, referring to FIG. 4, one end portion of the rotation portion 50 is rotatably coupled to the luggage trim and is provided to cross the housing portion 10. The rotation portion 50 rotates so that the housing portion 10 is positioned in a vertical direction of the vehicle body when fixation between the housing magnet 22 and the door trim 8 is released. To the present end, the rotation portion 50 includes a rotation pin 52 penetrating through a side portion of the housing portion 10 and a rotation spring 54 provided on an external circumferential surface of the rotation pin 52 to provide a rotation force to the rotation pin 52.

The rotation spring 54 may be wound around the external circumferential surface of the rotation pin 52 outside the housing portion 10, and one end portion of the rotation spring 54 is fixed to the housing portion 10 to provide an elastic rebound force for restoration in the vertical direction when the housing portion 10 is positioned in the horizontal direction of the vehicle body. That is, when the housing portion 10 is disposed in the horizontal direction of the vehicle body as the magnetic force is generated at the door magnet 21, and then the magnetic force of the door magnet 21 is released according to a door opening signal, the housing portion 10 rotates in the vertical direction of the vehicle body by the elastic rebound force of the rotation spring 54.

Figure 9A:
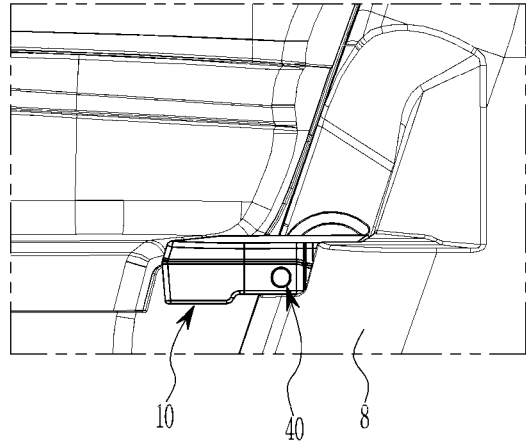
FIG. 9A and FIG. 9B are views exemplarily illustrating states of the vehicle door armrest according to an exemplary embodiment of the present disclosure when the door is opened and closed.
Figure 9B:
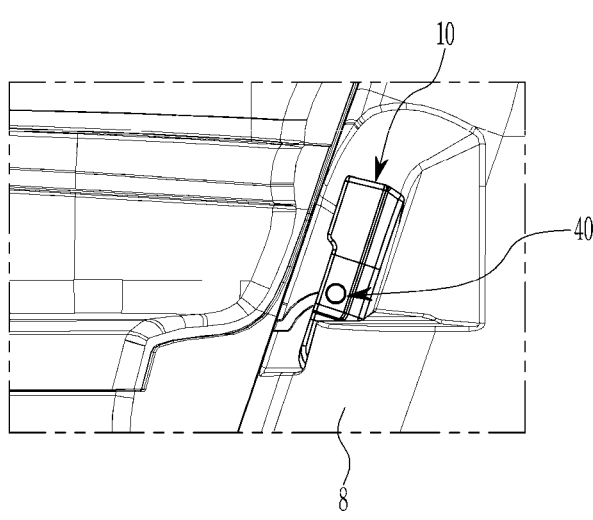

FIG. 9A and FIG. 9B are views exemplarily illustrating states of the vehicle door armrest according to an exemplary embodiment of the present disclosure when the door is opened and closed.

As illustrated in FIGS. 9A, in a state where the door is closed, a passenger rotates the housing portion 10 of the door armrest 100 to be positioned in the horizontal direction of the vehicle body, and power is applied to the door magnet 21, so that the position of the housing portion 10 is maintained in the horizontal direction of the vehicle body by the magnetic force between the door magnet 21 and the housing magnet 22.

When the door opening signal is generated, as the power applied to the door magnet 21 is released and the magnetic force between the door magnet 21 and the housing magnet 22 is released, the return bracket portion 30 rotates, and fixation of the housing portion 10 to the door trim 8 is released. At the instant time, the housing portion 10 rotates around the rotation pin 52 by the elastic rebound force of the rotation spring 54 of the rotation portion 50 and is positioned in the vertical direction of the vehicle body.

In the present way, the door armrest functions as an armrest when the door is closed, and operates to be positioned in such a way as to prevent interference with opening of the door when the door is opened, and as a result, usability may be greatly improved.

Figure 10A:
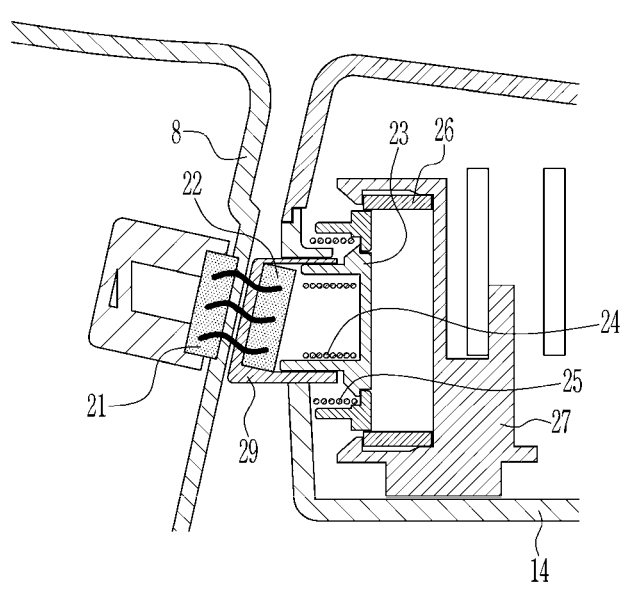
FIG. 10A and FIG. 10B are views exemplarily illustrating a connection relationship between the housing magnet of the vehicle door armrest according to an exemplary embodiment of the present disclosure and the door magnet when the door is opened and closed.
Figure 10B:
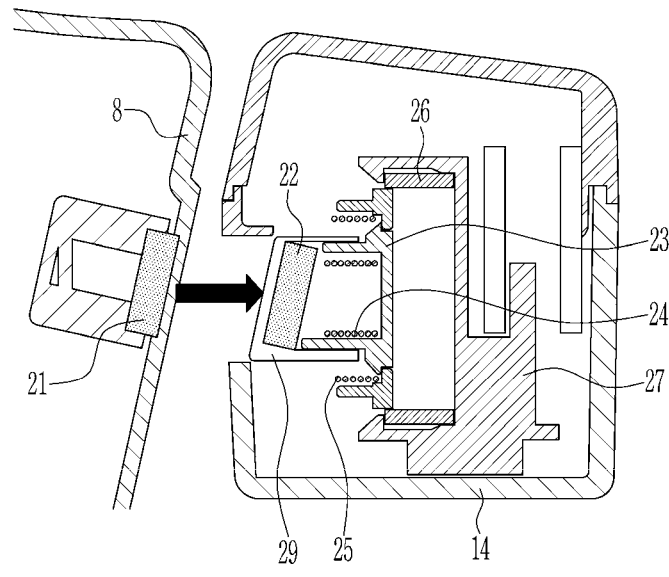

FIG. 10A and FIG. 10B are views exemplarily illustrating a connection relationship between the housing magnet of the vehicle door armrest according to an exemplary embodiment of the present disclosure and the door magnet when the door is opened and closed.

Referring to FIG. 10A, as described above, when power is applied to the door magnet 21 in a state where the door is closed, the magnetic force (attractive force) is generated between the door magnet 21 formed of an electromagnet and the housing magnet 22 formed of a permanent magnet, and the housing portion 10 is fixed to the door trim 8 by the magnetic force, so that the position of the housing portion 10 is maintained in the horizontal direction of the vehicle body.

Accordingly, when the door opening signal is generated, as the power applied to the door magnet 21 is released and the magnetic force between the door magnet 21 and the housing magnet 22 is released, fixation between the housing portion 10 and the door trim 8 is released. Furthermore, the housing portion 10 rotates in the horizontal direction of the vehicle body by the elastic rebound force provided by the rotation portion 50 (FIG. 10B).

FIG. 11A, FIG. 11B, FIG. 11C, and FIG. 11D are views exemplarily illustrating states of the vehicle door armrest according to an operation of the button portion of the vehicle door armrest according to an exemplary embodiment of the present disclosure.

Figure 11A:
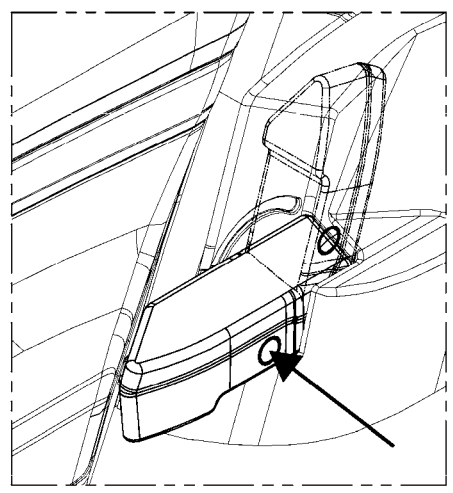
FIG. 11A, FIG. 11B, FIG. 11C, and FIG. 11D are views exemplarily illustrating states of the vehicle door armrest according to an operation of the button portion of the vehicle door armrest according to an exemplary embodiment of the present disclosure.
Figure 11B:
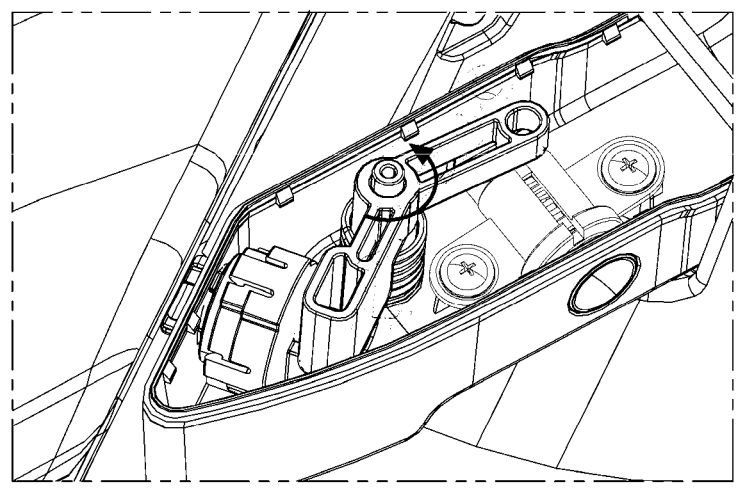
Figure 11C:
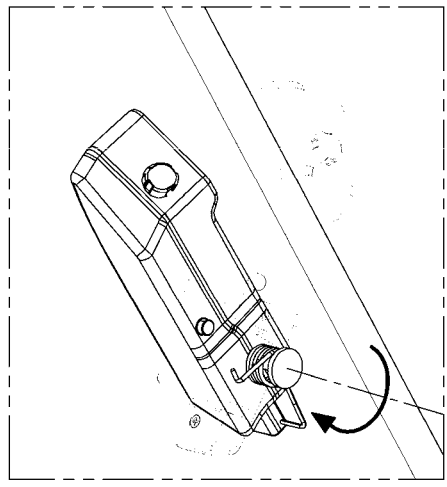
Figure 11D:
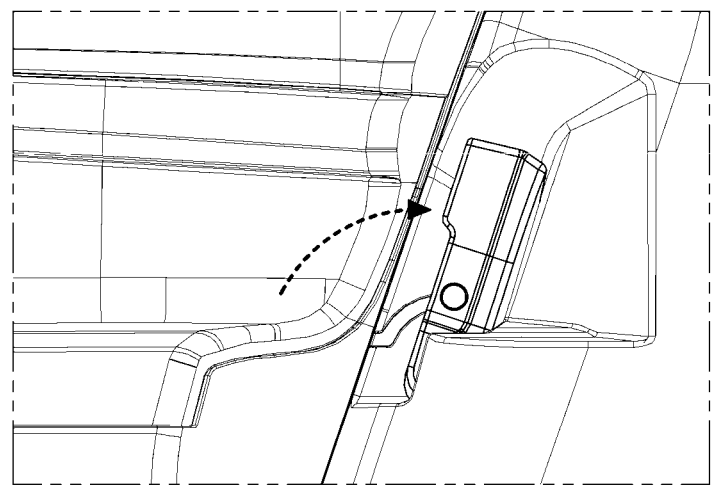

Referring to FIG. 11A and FIG. 11B, as described above, in a case where a passenger wants to rotate the door armrest 100 regardless of the door opening signal, when the passenger pushes the button portion 40 (FIG. 11A), the return bracket portion 30 rotates, and the door magnet 21 and the housing magnet 22 are separated from each other (FIG. 11B). Accordingly, the housing portion 10 rotates around the rotation pin 52 by a restoring force of the rotation spring 54 of the rotation portion 50 (FIG. 11C), and the door armrest 100 rotates to a position where the door armrest 100 does not interfere with opening of the door (FIG. 11D).

Figure 12:
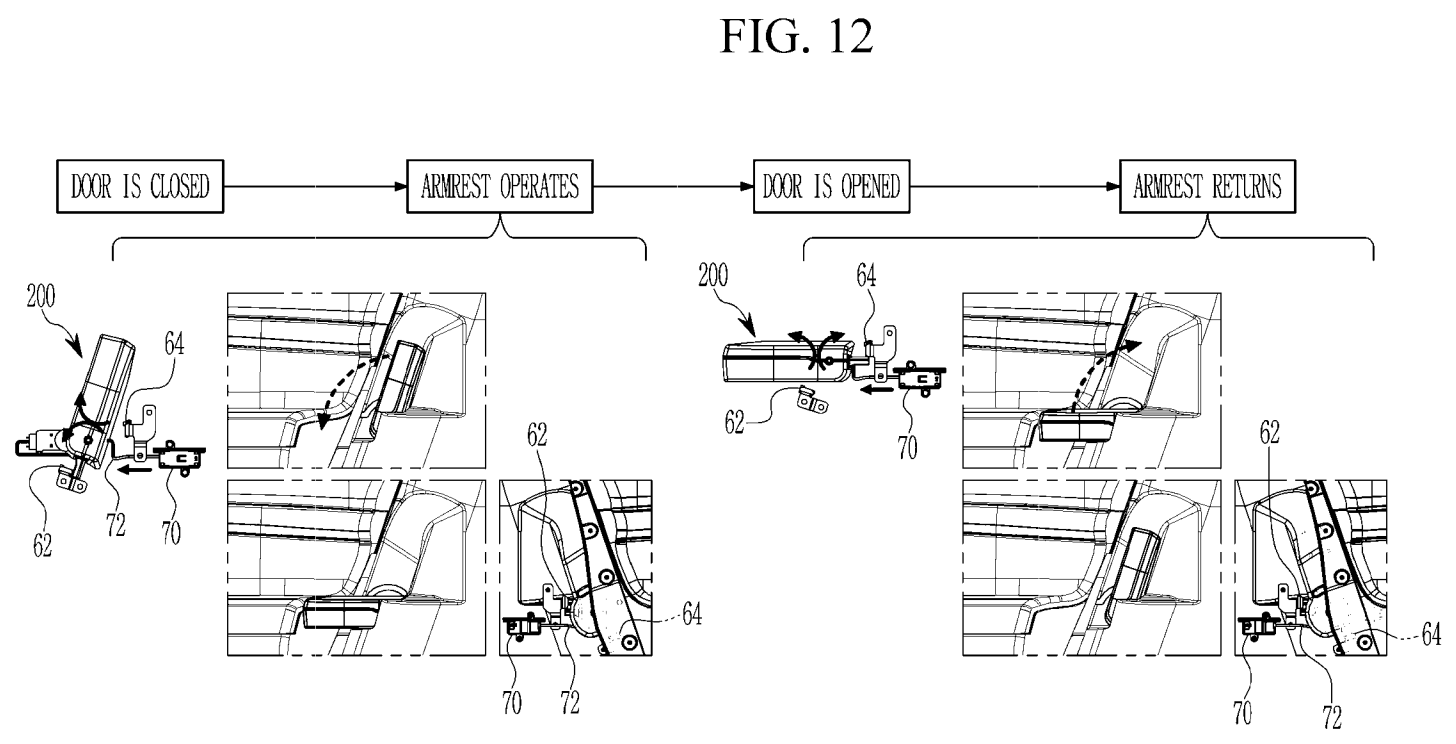
Figure 13:
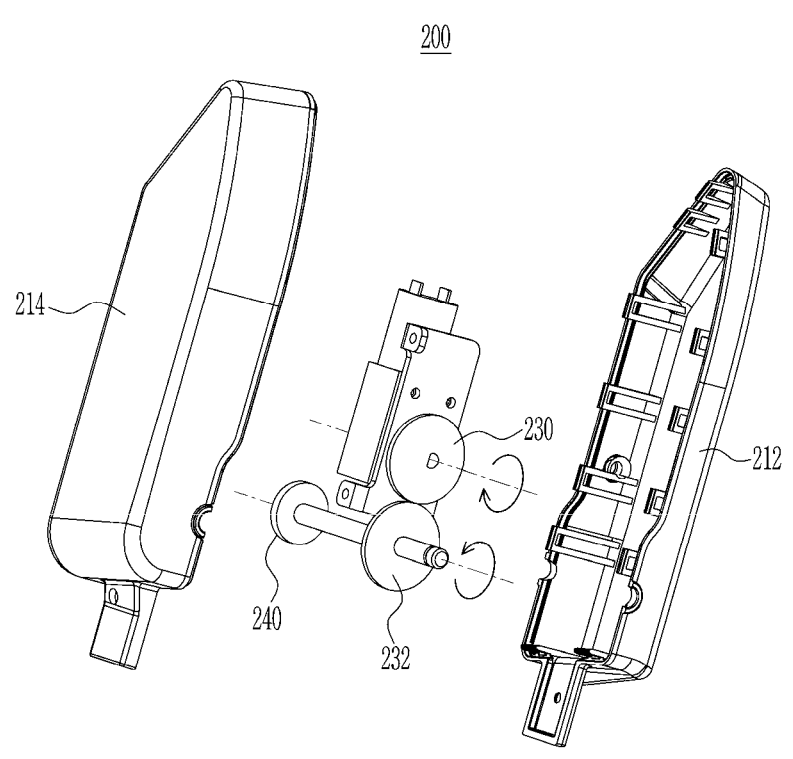
FIG. 13 is a perspective view exemplarily illustrating the inside of a housing portion of the vehicle door armrest according to another exemplary embodiment of the present disclosure.
Figure 14:
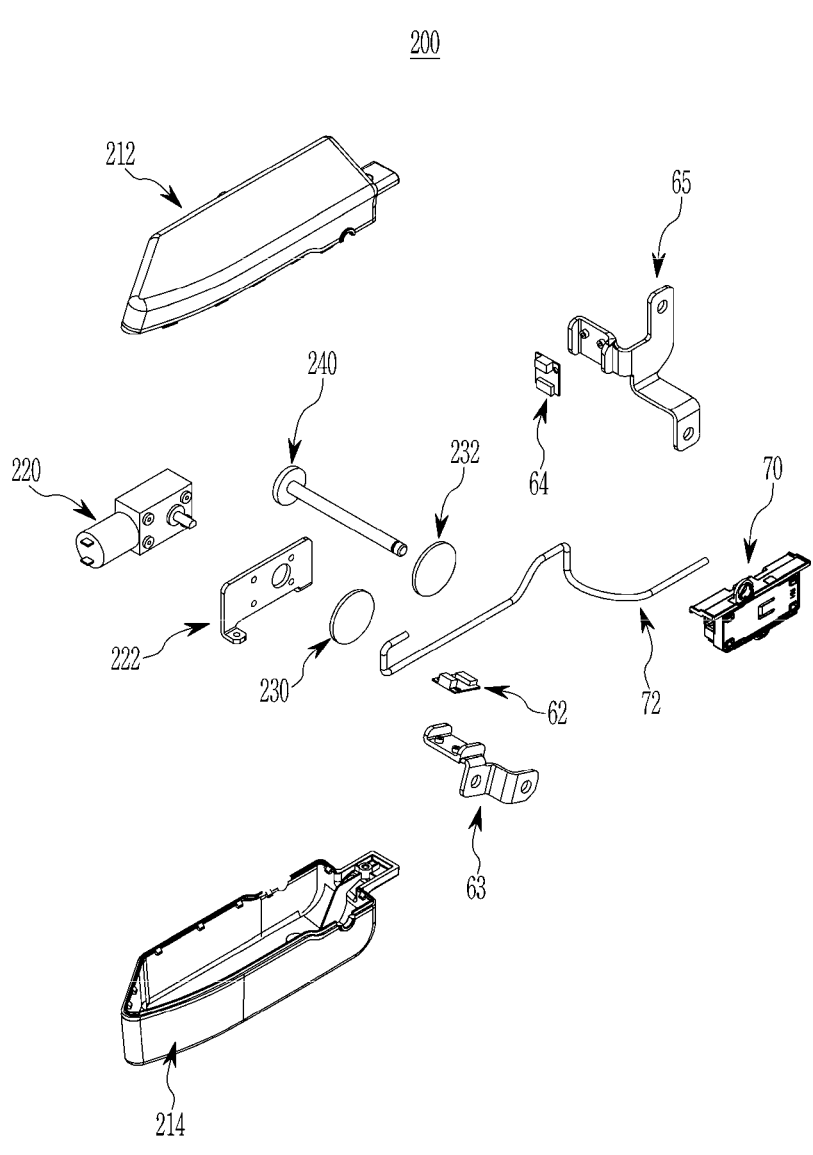
FIG. 14 is an exploded perspective view of the vehicle door armrest according to another exemplary embodiment of the present disclosure.

FIG. 12 is a view exemplarily illustrating states of a vehicle door armrest according to another exemplary embodiment of the present disclosure when the door is opened and closed. FIG. 13 is a perspective view exemplarily illustrating the inside of a housing portion of the vehicle door armrest according to another exemplary embodiment of the present disclosure. FIG. 14 is an exploded perspective view of the vehicle door armrest according to another exemplary embodiment of the present disclosure.

Referring to FIG. 12, FIG. 13 and FIG. 14, a vehicle door armrest 200 according to another exemplary embodiment of the present disclosure includes a housing portion (212 and 214), a motor 220, and a rotation shaft 240.

The housing portion (212 and 214) may include an upper housing 212 which is provided on an internal side of the luggage trim and configured to rotate along an internal surface of the door trim 8 and on which an arm of a passenger is directly placed, and a lower housing 214 coupled to the upper housing 212 to form a space inside the housing portion.

The motor 220 may be housed in the housing portion (212 and 214) and be driven when a door opening signal is generated to rotate the housing portion (212 and 214). The motor 220 may be fixed inside the housing portion (212 and 214) by a motor bracket 222 in the housing portion (212 and 214).

The rotation shaft 240 may have one end portion rotatably coupled to the luggage trim and be provided to cross the housing portion (212 and 214), so that the housing portion (212 and 214) is positioned in the vertical direction of the vehicle body when the motor 220 is driven.

A rotation gear 232 is provided at the other end portion of the rotation shaft 240, and the rotation gear 232 is positioned to mesh with a motor gear 230 provided on a shaft of the motor 220. When the shaft of the motor 220 rotates, the rotation gear 232 meshing with the motor gear 230 rotates, so that the housing portion (212 and 214) may rotate.

Meanwhile, position sensors 62 and 64 that detect the position of the housing portion (212 and 214) and an electronic control unit (ECU) 70 that is configured to control rotation of the housing portion (212 and 214) may be provided on an external side of the luggage trim. The position sensors 62 and 64 may be fixed to the luggage trim by sensor brackets 63 and 65, respectively. The position sensor 62 may be provided at a position where the position sensor 62 comes into contact with the housing portion (212 and 214) when the housing portion (212 and 214) is positioned in the horizontal direction of the vehicle body, and the position sensor 64 may be provided at a position where the position sensor 64 comes into contact with the housing portion (212 and 214) when the housing portion (212 and 214) is positioned in the vertical direction of the vehicle body. Furthermore, the ECU 70 may be connected to the position sensors 62 and 64 by a wire 72 to receive position signals of the housing portion (212 and 214) from the position sensors 62 and 64, controlling rotation of the housing portion (212 and 214).

When a door closing signal is input, the motor 220 is driven to rotate the housing portion (212 and 214), so that the housing portion (212 and 214) is positioned in the horizontal direction of the vehicle body. When the housing portion (212 and 214) rotates and a lower surface of the lower housing 214 faces the position sensor 62 and is detected, the driving of the motor 220 is stopped (power is cut off) under the control of the ECU 70, and the rotation of the housing portion (212 and 214) also stops.

When a door opening signal is input, the motor 220 is driven to rotate the housing portion (212 and 214), so that the housing portion (212 and 214) is positioned in the vertical direction of the vehicle body. When the housing portion (212 and 214) rotates and an upper surface of the upper housing 212 faces the position sensor 64 and is detected, the driving of the motor 220 is stopped under the control of the ECU 70, and the rotation of the housing portion (212 and 214) also stops.

As described above, according to an exemplary embodiment of the present disclosure, as the active door armrest structure that functions as an armrest when a hinged compartment door is closed, and rotates in such a way as not to interfere with opening of the compartment door when the compartment door is opened is provided, it is possible to secure a door armrest space for supporting an arm of a passenger.

Furthermore, cost reduction and a high degree of layout freedom may be achieved by not requiring a separate device in securing a space for a door armrest and eliminating interference occurring in a process of opening and closing a sliding door.

Furthermore, as the automatically rotatable armrest structure using the motor and the sensor is applied, usability may be greatly improved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle door armrest apparatus provided on a luggage trim connected to a rear side of a door trim in a door of a vehicle, the vehicle door armrest apparatus comprising:
    a housing portion on which an arm of a passenger is to be placed and which is disposed on an internal side of the luggage trim and configured to rotate along an internal surface of the door trim; and
    a housing magnet operating to fix or release the housing portion to or from the door trim by generating or releasing a magnetic force depending on whether power is applied to the housing magnet with the door trim located between the housing magnet and a door magnet.

2. The vehicle door armrest apparatus of claim 1, further including:
    a return bracket portion housed in the housing portion, including a first portion fixed to the housing magnet, and rotating when the magnetic force is released to release the housing portion from the door trim;
    a button portion provided in the housing portion and coming into contact with a second portion of the return bracket portion to rotate the return bracket portion; and
    a rotation portion including one end portion rotatably coupled to the luggage trim, provided to cross the housing portion, and rotating so that the housing portion is positioned in a vertical direction of a vehicle body when the housing magnet is released from the door trim.

3. The vehicle door armrest apparatus of claim 2, wherein the housing portion includes:

an upper housing on which the arm of the passenger is to be directly placed, and a lower housing coupled to the upper housing and housing the housing magnet, the return bracket portion, the button portion, and the rotation portion therein.

4. The vehicle door armrest apparatus of claim 2, wherein the housing magnet faces the door magnet fixed on the door trim and is connected or disconnected to or from the door magnet by the magnetic force applied to or released from the door magnet.

5. The vehicle door armrest apparatus of claim 2, wherein the housing magnet is provided on an external cover guide that covers the housing magnet and is in contact with the return bracket portion to move forwards and backwards with respect to the door trim according to an operation of the return bracket portion.

6. The vehicle door armrest apparatus of claim 5, wherein a guide cap that moves forwards and backwards with respect to the door trim according to the operation of the return bracket portion, an internal cover guide that covers the guide cap, and a magnet cap that houses the housing magnet and passes through an opening of the housing portion, are provided on the external cover guide.

7. The vehicle door armrest apparatus of claim 6, wherein an internal spring is located between the housing magnet and the guide cap, and wherein an external spring is located between the lower housing and the internal cover guide.

8. The vehicle door armrest apparatus of claim 4, wherein the door magnet is provided on a fixing bracket fixed on the door trim.

9. The vehicle door armrest apparatus of claim 4, wherein the return bracket portion rotates in a horizontal direction of the housing portion around a rotation shaft inside the housing portion, wherein the return bracket portion includes a return bracket including a first portion which is in contact with the external cover guide and a second portion which is in contact with the button portion, and wherein a return spring that provides an elastic force to release an attractive force between the housing magnet and the door magnet when the magnetic force applied to the door magnet is released.

10. The vehicle door armrest apparatus of claim 2, wherein the button portion includes:

a push button which is provided to penetrate through one side portion of the housing portion, a button cover which is provided inside the housing portion and guides the push button, and a cap button which is provided on a side opposite to the push button and comes into contact with or is separated from the second portion of the return bracket portion.

11. The vehicle door armrest apparatus of claim 10, wherein a button spring that provides an elastic rebound force between the push button and the cap button is provided on an external circumferential surface of the push button.

12. The vehicle door armrest apparatus of claim 11, wherein a button socket which is in contact with the button spring while supporting the push button is located between the external circumferential surface of the push button and the button spring.

13. The vehicle door armrest apparatus of claim 4, wherein the rotation portion includes:

a rotation pin penetrating through a side portion of the housing portion, and a rotation spring provided on an external circumferential surface of the rotation pin to provide a rotation force to the rotation pin.

14. The vehicle door armrest apparatus of claim 13, wherein when a door opening signal is generated, the magnetic force applied to the door magnet is released, the return bracket portion rotates to release an attractive force between the door magnet and the housing magnet, and the rotation portion rotates so that the housing portion rotates to be positioned in the vertical direction of the vehicle body.

15. The vehicle door armrest apparatus of claim 4, wherein in response that the passenger pushes the button portion, the button portion pushes the second portion of the return bracket portion, and the return bracket portion rotates to release an attractive force between the housing magnet provided at the one portion of the return bracket portion, and the door magnet.

16. A vehicle door armrest apparatus provided on a luggage trim connected to a rear side of a door trim in a door of a vehicle, the vehicle door armrest apparatus comprising:

a housing portion on which an arm of a passenger is to be placed and which is disposed on an internal side of the luggage trim and configured to rotate along an internal surface of the door trim;

a motor housed in the housing portion and driven when a door opening signal is generated to rotate the housing portion; and a rotation shaft including a first end portion rotatably coupled to the luggage trim, provided to cross the housing portion, and rotating so that the housing portion is positioned in a vertical direction of a vehicle body when the motor is driven.

17. The vehicle door armrest apparatus of claim 16, wherein the housing portion includes:

an upper housing on which the arm of the passenger is to be directly placed, and a lower housing coupled to the upper housing to form a space inside the housing portion.

18. The vehicle door armrest apparatus of claim 16, wherein a rotation gear is provided at a second end portion of the rotation shaft, and wherein the rotation gear gear-meshed with a motor gear provided on a shaft of the motor rotates together with the motor gear.

19. The vehicle door armrest apparatus of claim 16, wherein the motor is fixed inside the housing portion by a motor bracket in the housing portion.

20. The vehicle door armrest apparatus of claim 16, wherein position sensors that detect a position of the housing portion, and an electronic control unit which is configured to control rotation of the housing portion, are provided on an external side of the luggage trim.

* * * * *